(12) United States Patent
Kim et al.

(10) Patent No.: US 10,405,149 B2
(45) Date of Patent: Sep. 3, 2019

(54) ENHANCED MBMS-BASED SIGNAL TRANSMISSION/RECEPTION METHOD

(71) Applicant: Samsung Electronics Co., Ltd., Suwon-si, Gyeonggi-do (KR)

(72) Inventors: Hanseok Kim, Seoul (KR); Dongsook Kim, Suwon-si (KR); Juyoung Kim, Hwaseong-si (KR); Junhyuk Song, Anyang-si (KR); Hyungtaig Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 15/176,619

(22) Filed: Jun. 8, 2016

(65) Prior Publication Data

US 2016/0366566 A1 Dec. 15, 2016

Related U.S. Application Data

(60) Provisional application No. 62/172,927, filed on Jun. 9, 2015.

(30) Foreign Application Priority Data

Sep. 2, 2015 (KR) ........................ 10-2015-0124224

(51) Int. Cl.
*H04W 4/08* (2009.01)
*H04L 12/24* (2006.01)
(Continued)

(52) U.S. Cl.
CPC ............. *H04W 4/08* (2013.01); *H04L 41/083* (2013.01); *H04L 43/106* (2013.01); *H04W 28/0236* (2013.01)

(58) Field of Classification Search
CPC .. H04W 4/08; H04W 28/0236; H04L 41/083; H04L 43/106
See application file for complete search history.

(56) References Cited

U.S. PATENT DOCUMENTS

2011/0164544 A1 7/2011 Ai et al.
2011/0206019 A1 8/2011 Zhai et al.
(Continued)

FOREIGN PATENT DOCUMENTS

KR 10-2015-0015853 A 2/2015

OTHER PUBLICATIONS

Eads, Using eMBMS transport for voice, 3GPP Draft, S2-140606, 3rd Generation Partnership Project (3GPP), Mobile Competence Centre, 650, Route Des Lucioles, F-06921, Sophia-Antipolis Cedex, France, vol. SA WG2, KP050770166, Feb. 17, 2014.
(Continued)

*Primary Examiner* — Walter J Divito
(74) *Attorney, Agent, or Firm* — Jefferson IP Law, LLP

(57) ABSTRACT

A method and an apparatus for reducing delay in enhanced multimedia broadcast multicast services (eMBMS)-based group communication are provided. The method includes receiving the user packet, including information of a time stamp assigned by a broadcast/multicast service center (BM-SC), from the BM-SC, and transmitting the user packet to a terminal through a physical multicast channel based on information of the time stamp, wherein the time stamp is assigned at an interval set to a value less than a multimedia broadcast multicast services (MBMS) scheduling period.

12 Claims, 8 Drawing Sheets

(51) Int. Cl.
    *H04L 12/26*     (2006.01)
    *H04W 28/02*     (2009.01)

(56) References Cited

U.S. PATENT DOCUMENTS

| | | |
|---|---|---|
| 2012/0093055 A1 | 4/2012 | Zhai et al. |
| 2012/0243458 A1 | 9/2012 | Ai |
| 2015/0103726 A1 | 4/2015 | Kim et al. |
| 2015/0296467 A1* | 10/2015 | Kim ..................... H04W 56/00 370/330 |

OTHER PUBLICATIONS

European Search Report dated Mar. 19, 2018, issued in European Application No. 16807803.8-1213.

* cited by examiner

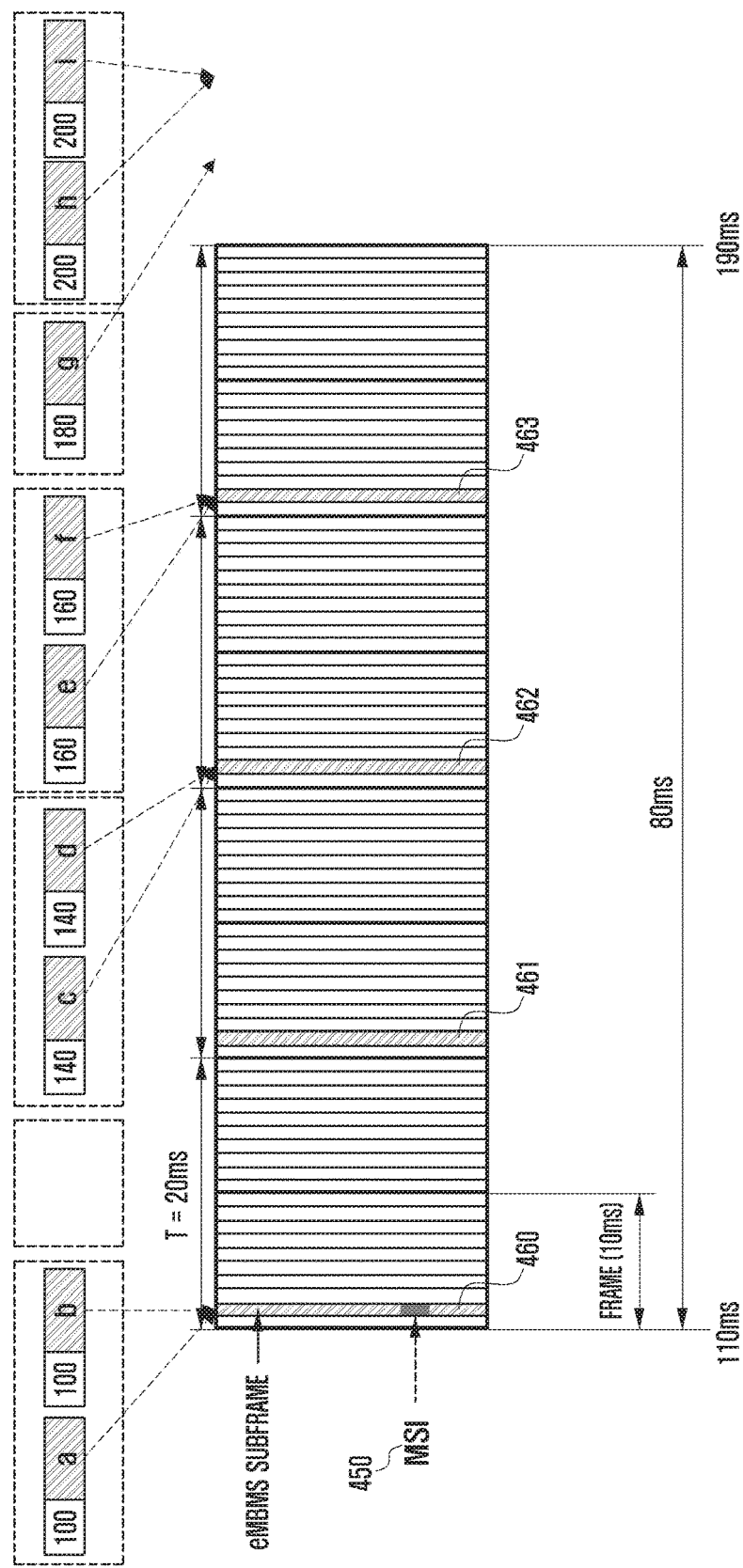

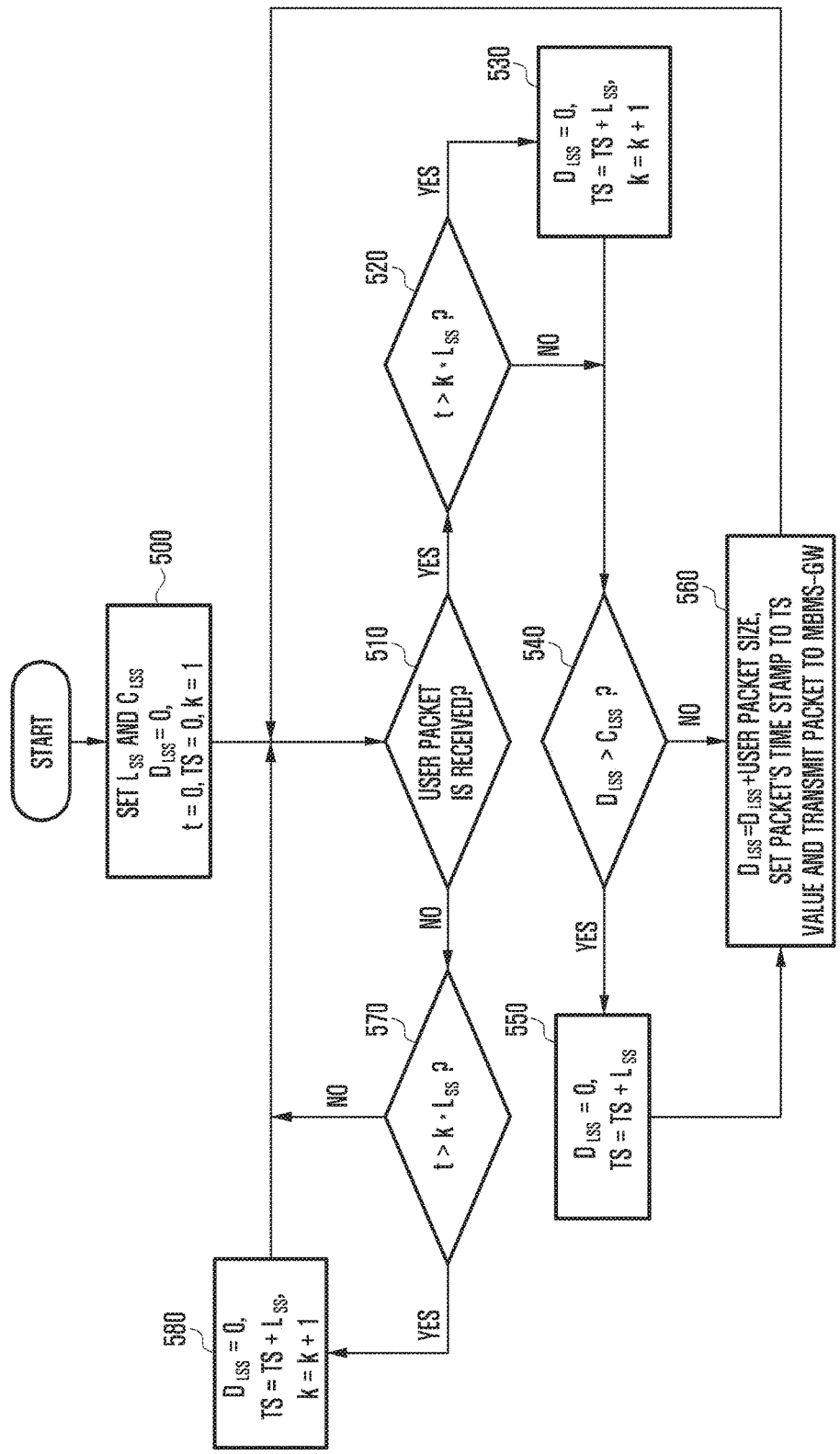

ENHANCED MBMS-BASED SIGNAL TRANSMISSION/RECEPTION METHOD

CROSS-REFERENCE TO RELATED APPLICATION(S)

This application claims the benefit under 35 U.S.C. § 119(e) of a U.S. provisional patent application filed on Jun. 9, 2015 in the U.S. Patent and Trademark Office and assigned Ser. No. 62/172,927, and under 35 U.S.C. § 119(a) of a Korean patent application filed on Sep. 2, 2015 in the Korean Intellectual Property Office and assigned Serial number 10-2015-0124224, the entire disclosure of each of which is hereby incorporated by reference.

TECHNICAL FIELD

The present disclosure relates to a method and apparatus for reducing delay in enhanced multimedia broadcast multicast services (MBMS)-based group communication.

BACKGROUND

Although cellular mobile communication networks have been designed to provide point-to-point transmission services, the advance in broadband radio transmission technology and diversified features of devices increase demands for various services. Particularly, the multimedia broadcast multicast services (MBMS) as a technology for providing mobile broadcast service over cellular communication networks have evolved into enhanced MBMS (eMBMS) which is studied to provide a disaster safety communication network based on the long term evolution (LTE).

Unlike the point-to-point transmission service, the MBMS is a point-to-multipoint transmission service which is advantageous in terms of improving radio resource utilization efficiency because a base station transmits the same packets to a plurality of terminals within a cell. The LTE-based MBMS adopts multi-cell transmission scheme in which multiple base stations transmit the same packet simultaneously, and this makes it possible to achieve diversity gain at the receiving terminal on the physical layer and thus improve transmission efficiency.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for reducing delay in enhanced multimedia broadcast multicast services (MBMS)-based group communication.

However, the disaster safety communication service provided using the legacy multimedia broadcast multicast services (MBMS) technology has a drawback of packet transmission delay and thus there is a need of a method for reducing the packet transmission delay.

In accordance with an aspect of the present disclosure, a method of a base station to transmit a user packet in a wireless communication system is provided. The method includes receiving the user packet, including information of a time stamp assigned by a broadcast/multicast service centre (BM-SC), from the BM-SC, and transmitting the user packet to a terminal through a physical multicast channel based on the information of the time stamp, wherein the time stamp is assigned at an interval set to a value less than a MBMS scheduling period.

In accordance with another aspect of the present disclosure, a method of a terminal to receive a user packet in a wireless communication system is provided. The method includes receiving the user packet from a base station through a physical multicast channel based on information of a time stamp, wherein the user packet includes the time stamp assigned by a BM-SC, and the time stamp is assigned at an interval set to a value less than a MBMS scheduling period.

In accordance with another aspect of the present disclosure, a base station for transmitting user packets in a wireless communication system is provided. The base station includes a transceiver configured to transmit and receive signals to and from a terminal, and a controller configured to control receiving the user packet including information of a time stamp assigned by a BM-SC from the BM-SC and transmitting the user packet to a terminal through a physical multicast channel based on the information of the time stamp, wherein the time stamp is assigned at an interval set to a value less than a MBMS scheduling period.

Other aspects, advantages, and salient features of the disclosure will become apparent to those skilled in the art from the following detailed description, which, taken in conjunction with the annexed drawings, discloses various embodiments of the pre sent disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4B is a diagram illustrating transmission resources of the node B (eNB) which transmits packets as shown in FIG. 4A according to an embodiment of the present disclosure;

FIG. 5 is a flowchart illustrating a user packet transmission procedure of the broadcast/multicast service centre (BM-SC) according to an embodiment of the present disclosure;

DETAILED DESCRIPTION

Figure 1:
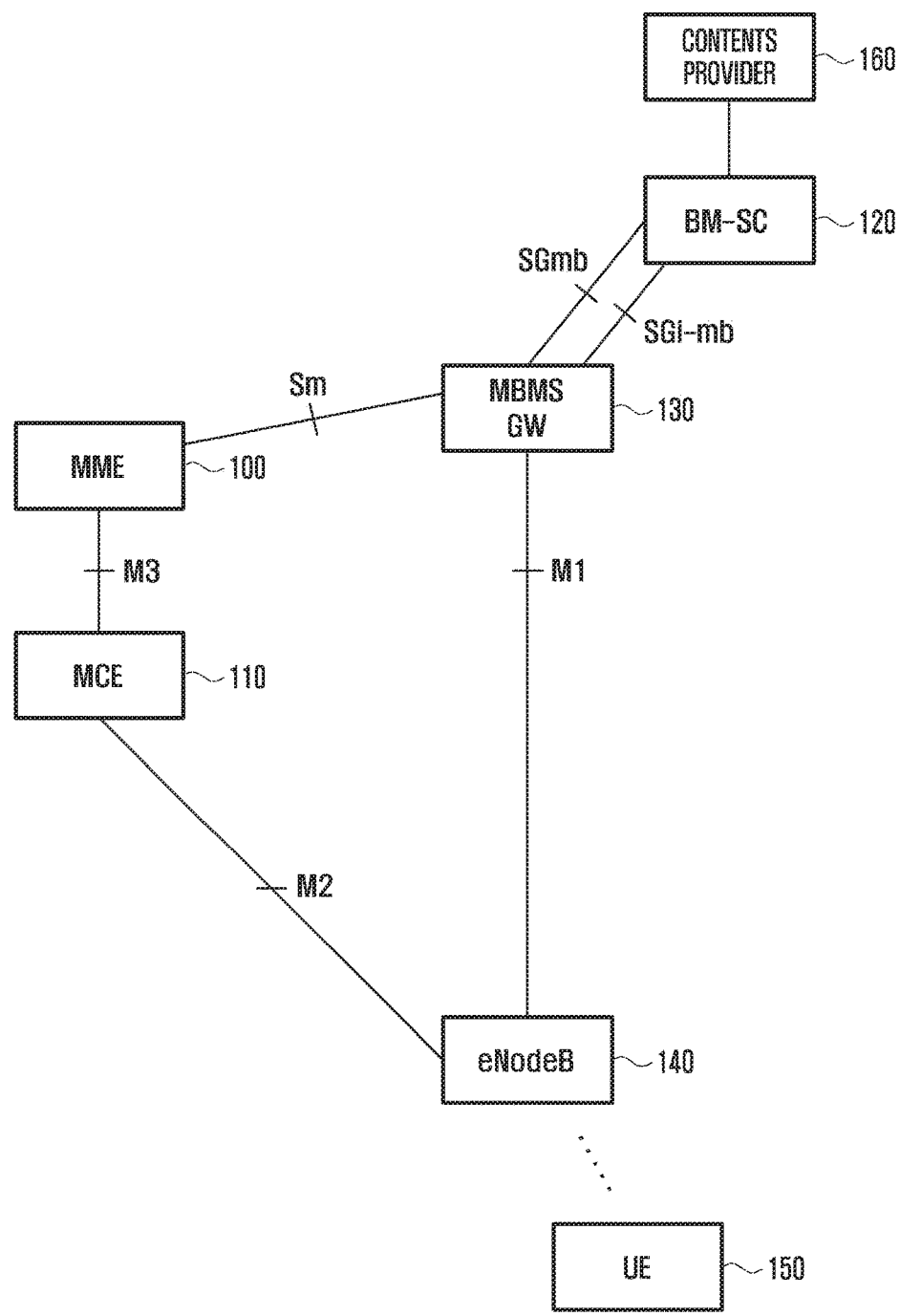
FIG. 1 is a diagram illustrating network architecture for multimedia broadcast multicast services (MBMS) in a long term evolution (LTE) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to the orthogonal frequency division multiplexing (OFDM)-based radio communication system, particularly the 3GPP EUTRAN, it will be understood by those skilled in the art that the present disclosure can be applied even to other communication systems having the similar technical background and channel format, with a slight modification, without departing from the spirit and scope of the present disclosure.

Advantages and features of the present disclosure and methods of accomplishing the same may be understood more readily by reference to the following detailed description of various embodiments and the accompanying drawings. The present disclosure may, however, be embodied in many different forms and should not be construed as being limited to the various embodiments set forth herein. Rather, these various embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to functions thereof.

According to various embodiments of the present disclosure, the term "module", means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and modules may be combined into fewer components and modules or further separated into additional components and modules. In addition, the components and modules may be implemented such that they execute one or more central processing units (CPUs) in a device or a secure multimedia card.

FIG. 1 is a diagram illustrating network architecture for multimedia broadcast multicast services (MBMS) in a long term evolution (LTE) system according to an embodiment of the present disclosure.

Referring to FIG. 1, the mobility management entity (MME) 100 controls an MBMS session and is connected to the MBMS coordination entity (MCE) 110 through an M3 interface. The MCE 110 is responsible for radio resource management and allocation to the enhanced node B (eNB), which is interchangeably referred to as base station) 140 connected to the MCE 110 and determines whether to accept an MBMS service. It determines a modulation and coding scheme (MCS) for MBMS services and controls MBMS sessions. The MCE 110 is a logical node and may be separated from the eNB to manage radio resource, and it may be distributed to the respective eNB such that one eNB becomes a master and other eNBs become slaves.

The broadcast/multicast service center (BM-SC) 120 is responsible for right authentication on the MBMS bearer services and service initiation and scheduling and transmission in consideration of service quality of MBMS contents. The BM-SC may transmit its broadcast contents to the LTE network and relay the broadcast contents from an external content provider 160. The BM-SC is connected to the MBMS Gateway (MBMS-GW) 130 via a state-change message bus (SCmb) interface for control message transmission and via a SGi-mb interface for contents (user traffic) transmission. The MBMS-GW 130 is responsible for MBMS session control (service start and end) function and transmits contents to the eNB in an internet protocol (IP) multicast transmission scheme. The MBMS-GW 130 is connected to the MME via a Sm interface for session control message transmission and via an M1 interface for contents transmission to the eNB 140.

The eNB 140 allocates radio resources to the user equipment (UE) (which is interchangeably referred to as terminal and mobile station) 150 for transmitting broadcast services scheduled by the MCE and performs synchronized transmission for the MBMS services. The eNB is connected to the MCE via a M2 interface for control signal transmission. The UE 150 receives the synchronized MBMS data.

Figure 2:
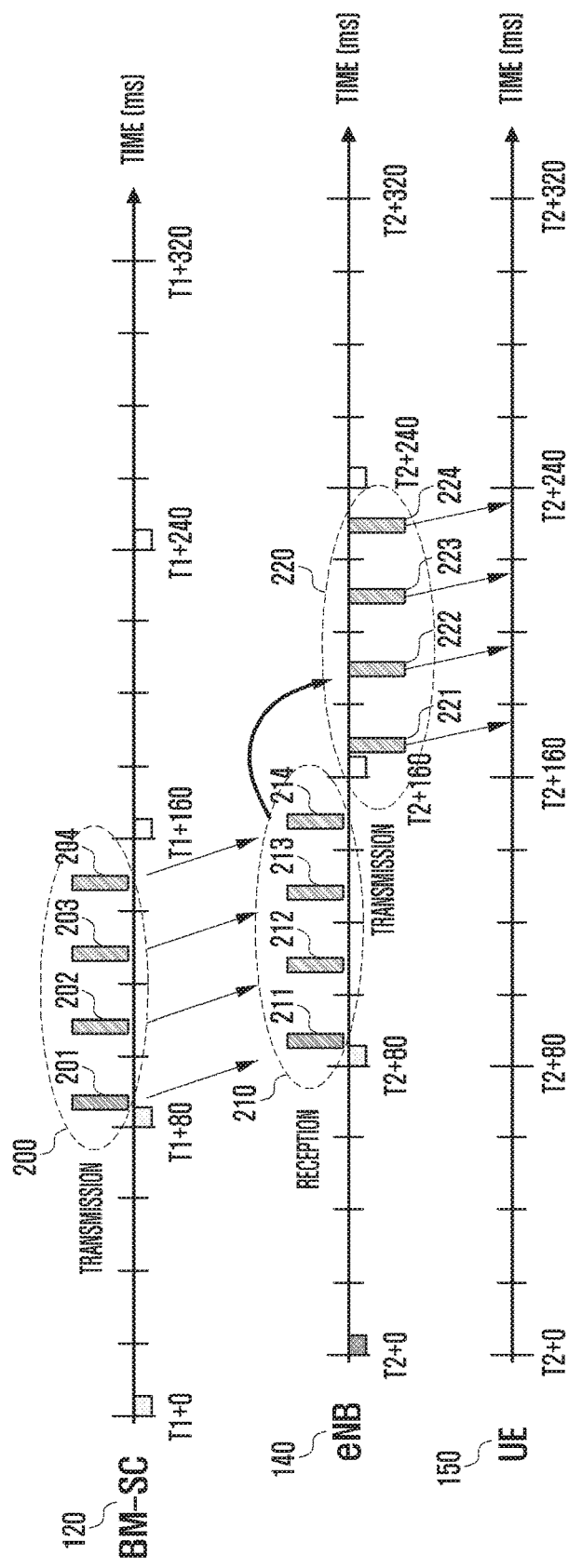
FIG. 2 is a diagram illustrating a legacy enhanced MBMS (eMBMS)-based service provision method according to an embodiment of the present disclosure.

FIG. 2 is a diagram illustrating a legacy eMBMS-based service provision method according to an embodiment of the present disclosure.

The Release 12 for public safety LTE (PS-LTE) network supports eMBMS technology-based push-to-talk (PTT) service for broad group communication, and the minimum unit of multicast channel (MCH) scheduling period (MCH scheduling period (MSP)) is defined as 80 ms in Release 10.

In FIG. 2, the BM-SC 120 transmits 4 packets 201, 202, 203, and 204 during the period of T1+80 ms (80 ms period) as denoted by reference number 200. At this time, a time stamp (time for the eNB to schedule the packet over the radio link as the time for starting synchronization sequence (SYNC)) is set to 160 ms. The packets transmitted by the BM-SC are received by the eNB 140 during the period T2+80 ms (80 ms period) as denoted by reference numbers 211, 212, 213, and 214 (210), and the eNB determines whether all of the packets transmitted during the MSP period have been received, waits for the next MSP period according to the time stamp, generates multicast channel scheduling information (MSI) during the T2+160 period (160 ms period), and transmits the received packets as denoted by reference numbers 221, 222, 223, and 224 (220). Afterward, the UE 150 receives the user packet during the 160 ms period.

Referring to FIG. 2, the legacy eMBMS-based broadcast service operates in such a way of performing buffering and synchronization in unit of MSP and thus the delay increases once to twice the MSP in comparison to unicast transmission. Since the minimum value of the MSP is 80 ms, extra delay of 80 to 160 ms occurs; although the minimum value of the MSP is shortened to 40 ms for PS-LTE in Release 12, there is a room for further delay reduction to provide the disaster safety communication service.

Figure 3:
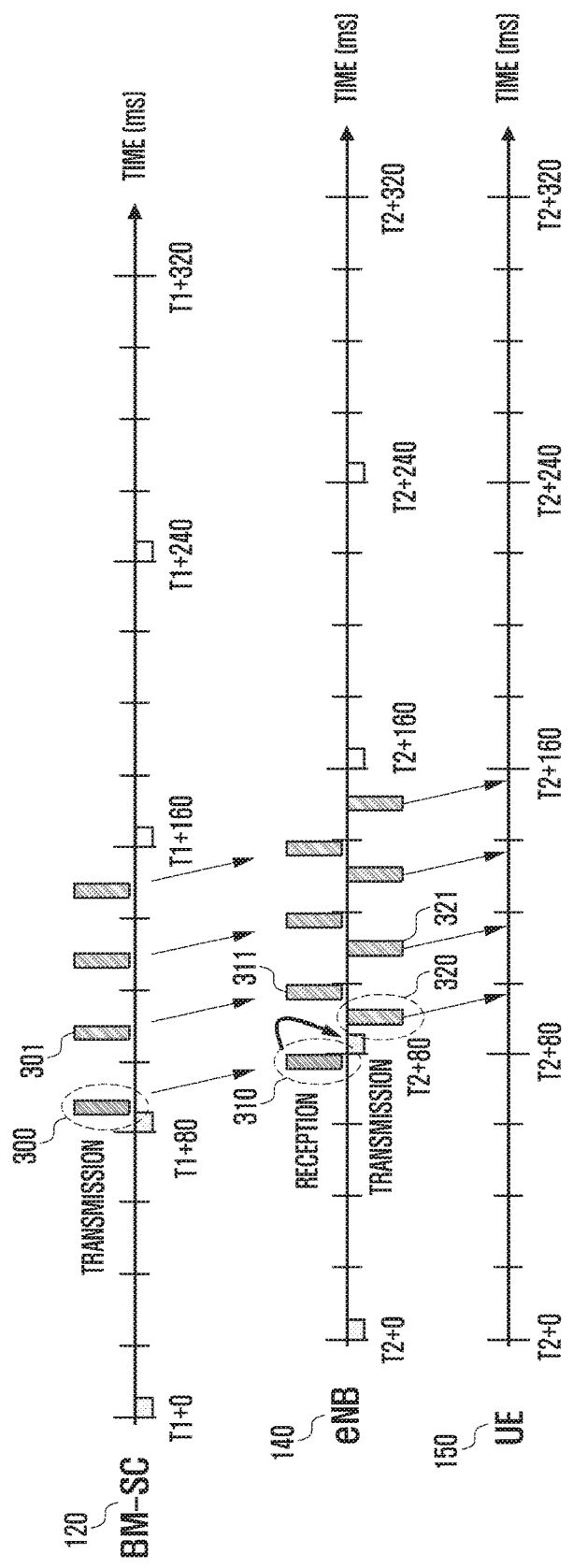
FIG. 3 is a diagram illustrating an eMBMS-based broadcast service according to an embodiment of the present disclosure.

FIG. 3 is a diagram illustrating an eMBMS-based broadcast service according to an embodiment of the present disclosure.

Referring to FIG. 3, since the PTT packet (hereinafter, interchangeably referred to as user packet or packet) is generated periodically, the BM-SC 120 assigns the time stamp to the user packet in unit of SYNC (synchronization) sequence length shorter than MSP, and the eNB 140 starts transmitting the user packet by generating a predetermined MSI without waiting for receipt of the last packet corresponding to the MSP. In detail, if the MSP is set to 80 ms and the synchronization sequence length is set to 20 ms, the packet transmission of FIG. 2 may be modified as shown in FIG. 3.

The BM-SC transmits to the eNB 140 the first user packet 300 in period of T1+80 ms (80 ms period) with the time stamp set to 80 ms. For the user packet 301 which is transmitted during the next 20 ms, the time stamp is set to 100 ms. If the user packet is received by the eNB during the 80 ms period as denoted by reference number 310, the eNB transmit the user packet to the UE 150 immediately according to the time stamp during the period of T2+80 ms (80 ms period) as denoted by reference number 320. The user packet 301 transmitted by the BM-SC during the next 20 ms has the time stamp set to 100 ms and thus the eNB 140 receives the user packet during the period of T2+100 ms (100 ms period) as denoted by reference number 311 and transmits the user packet to the UE 150 during the 100 ms period according to the configured time stamp as denoted by reference number 321.

According to the embodiment of FIG. 3, it may be possible to reduce the extra delay up to 20 ms using the characteristic in that the PTT packet is generated periodically in comparison to the method according to the related art characterized by buffering and synchronization in unit of MSP. The proposed method can be applied for reducing delay to the typical services which are provided at a variable data rate as well as the PTT service. In this case, it is possible to abide by the standard specifying the legacy eMBMS operation so as to attain compatibility in view of the UE. The eNB may receive a message indicating that the method of FIG. 3 is applied from the MCE.

Figure 4A:
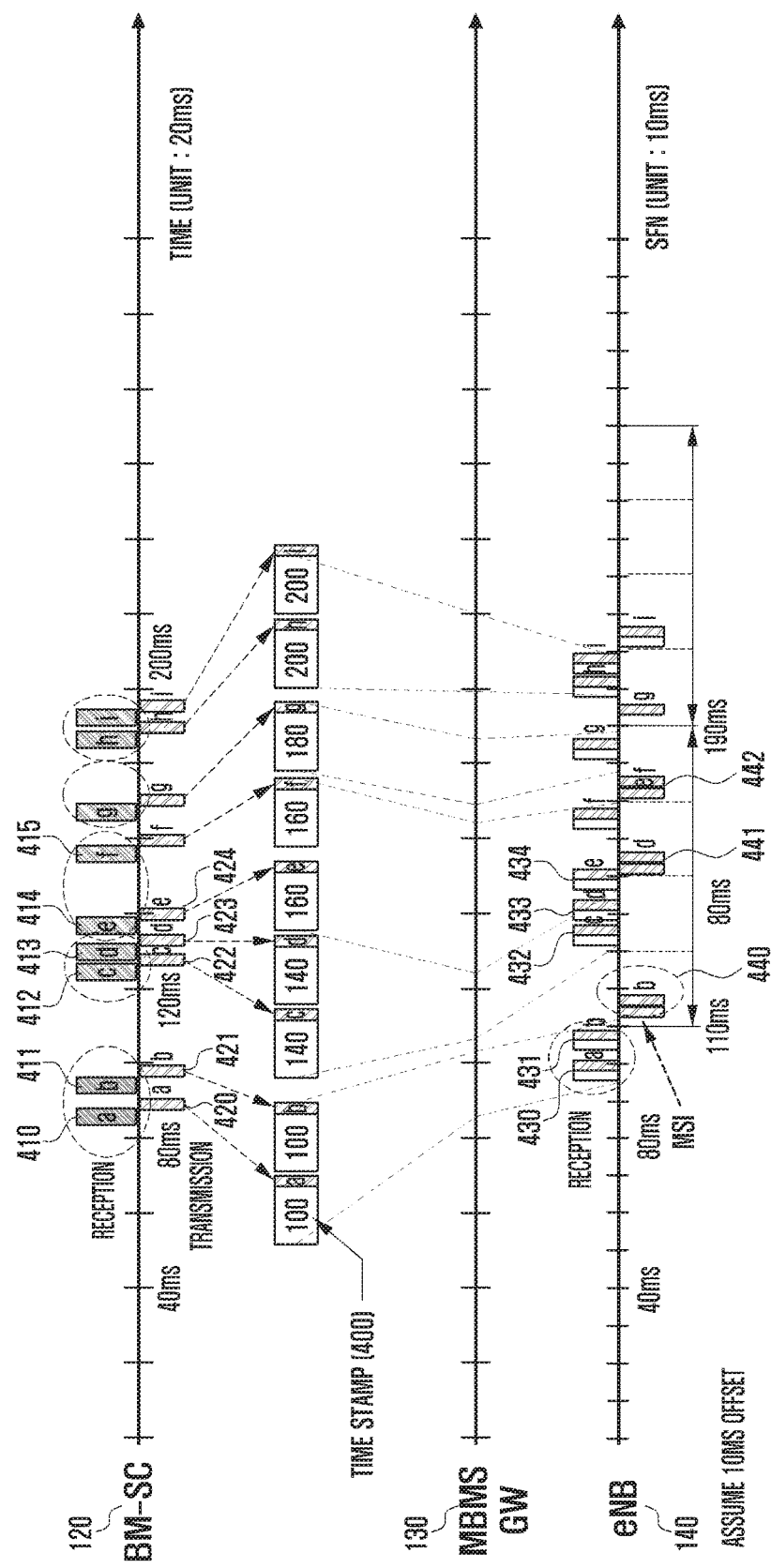
FIG. 4A is a diagram illustrating a method for generating and transmitting synchronization packets according to an embodiment of the present disclosure.

FIG. 4A is a diagram illustrating a method for generating and transmitting synchronization packets according to an embodiment of the present disclosure.

According to an embodiment of the present disclosure, if the number of PTT packets transmittable during the synchronization sequence length is N, the number of PTT groups per temporary mobile group identity (TMGI) can be increased up to M. At this time, N is determined according to the MCS value and packet size, and the subframe for PTT may be allocated every T ms with the TMGI for PTT. At this time, the default value of T may be set to 20 ms equal to the PTT packet occurrence interval. M is a configurable value and may be set to a default value of N*½.

Referring to FIG. 4A, the synchronization sequence length is set to 20 ms, MSP is set to 80 ms, and N is set to 2, and T is set to 20 ms. In FIG. 4A, the BM-SC may assign the same time stamp per N packets even when the user packets are transmitted at an irregular interval. If it is required to transmit the packets more than N in number during the synchronization sequence length, the BM-SC assigns the next time stamp (i.e., time stamp having a value increased as much as the synchronization sequence length) to the packets rather than discarding the packet. If the BM-SC transmits packets more than a predetermined number of packets per the synchronization sequence length, the eNB has to drop the packets arriving after the predetermined number of packets and thus it is preferred for the BM-SC to transmit the packets equal to or less than a predetermined number. In this way, it may be possible to avoid dropping packets received in burst for any reason such as handover. At this time, if M is set to a value less than N, it may also be possible to avoid delayed packet accumulation problem.

The time stamp value may be determined based on the time when the BM-SC has transmitted the user packet. For example, the time stamp may be set to a value of [transmission time/20]*20 (if T is 20, [x] may be a natural value equal to or greater than x). If the packet transmission time of the BM-SC is 191 ms, the time stamp of the packet is [191/20]*20, i.e., 200 ms.

In FIG. 4A, N is 2 at 80 ms, the BM-SC 120 transmits two user packets 410 and 411. Since the two user packets are transmitted be between 80 ms and 100 ms, the BM-SC transmits the two packets with the time stamp set to 100 ms as denoted by reference number 420 and 421, and the eNB 140 receives the user packets via the MBMS-GW 130. Assuming that there is a time offset of 10 ms between the BM-SC and the eNB, the eNB inserts a predefined MSI into the user packet transmitted first during the MSP and transmits the packet without waiting until all user packets are received completely during the MSP (80 ms). That is, the eNB receives the two user packets 410 and 411 transmitted by the BM-SC as denoted by reference number 430 and 431 and generates a packet 440 by combining the two user packets received at 110 ms in consideration of the time stamp value of the received packets and the time offset and transmits the packet 440 to the UE.

If there are three packets 412, 413, and 414 to be transmitted to the user during the period between 120 ms and 140 ms, the BM-SC 120 which can transmit only two user packets during the synchronization sequence length transmits the first two user packets 422 and 423 with the time stamp 140 and the last user packet 424 with the time stamp 160. The eNB 140 receives the three user packets transmitted by the BM-SC via the MBMS-GW 130 as denoted by reference number 432, 433, and 434. The eNB combines the first two packets into one packet 441 in consideration of the time stamp value of the received packets and the time offset and transmits the packet 441 at time 150 ms, and combines the last packet with another packet 415 with the time stamp set to 160 and the combined packet 442 to the UE at time 170 ms.

FIG. 4B is a diagram illustrating transmission resources of the eNB which transmits packets as shown in FIG. 4A according to an embodiment of the present disclosure.

Referring to FIG. 4B, the eNB may transmit packets in the eMBMS subframes 460, 461, 462, and 463 starting at 110 ms, 130 ms, 150 ms, and 170 ms, respectively, during the MSP (80 ms) starting at 110 ms. Since the time stamps of the user packets received by the eNBs are 100, 140, and 160, the user packets are transmitted in the eMBMS subframes 460, 462, and 463 at 110 ms, 150 ms, and 170 ms. In detail, the packet a and b with the time stamp 100 are transmitted in the eMBMS subframe 460, and the packets c and d with the time stamp 140 are transmitted in the eMBMS subframe 462.

The eMBMS subframe at 110 ms coveys the MSI 450 which includes subframe resource information indicating resource allocation every 20 ms during the period of 80 ms. The resource information may be predefined or configured. If there is no predefined information, the corresponding space may be filled with padding.

The method of the present disclosure may also be applied to packet transmission for typical variable-rate services. For example, assuming that the average packet generation amount is B bytes during the synchronization sequence length for the service provided at the average rate of A bits per second (bps), the Push to Video service characterized by the synchronization sequence length of 20 ms and average rate A of 800 kbps has the average packet generation amount B of 2000 Bytes during the synchronization sequence length.

Assuming that the packet transmission amount during the synchronization sequence length is L bytes, it may be possible to accommodate up to K service groups per TMGI. At this time, L is determined based on the MCS value and packet size, and the subframe with TMGI is allocated every T ms. The default value of T may be set to 20 ms. At this time, K is a configurable value, and its default value may be set to $L*(1/2B)$.

Assuming L of 4000 bytes and B of 2000 bytes and packet size of 1000 bytes, the BM-SC assigns the same time stamp to the packets as much as 2000 bytes among the packets received during the synchronization sequence length. The BM-SC assigns a next time stamp (i.e., time stamp having a value increased as much as the synchronization sequence length) to the packets received after the 2000 bytes. By setting the number of transmittable packets to any appropriate value less than L based on K, it is possible to avoid delayed packet accumulation problem.

FIG. 5 is a flowchart illustrating a user packet transmission procedure of the BM-SC according to an embodiment of the present disclosure.

Referring to FIG. 5, t denotes the current time, TS denotes the time stamp, $L_{SS}$ denotes the synchronization sequence length, $C_{LSS}$ denotes the amount of packets (bytes) transmittable during $L_{SS}$, and $D_{LSS}$ denotes the packet transmission amount (byte) during $L_{SS}$. The TS, $L_{SS}$, $C_{LSS}$, and $D_{LSS}$ are configured per TMGI.

In FIG. 5, the BM-SC sets $L_{SS}$ and $C_{LSS}$ based on TMGI at operation 500. At this time, other parameters are set together (i.e. $D_{LSS}$=0, t=0, TS=0, k=1). The BM-SC determines whether a user packet is received at operation 510 and, if so, determines whether the current time t is greater than $k*L_{SS}$ at operation 520. If t is greater than $k*L_{SS}$, the BM-SC sets $D_{LSS}$=0, TS=TS+$L_{SS}$, and k=k+1 at operation 530 and, otherwise, determines whether $D_{LSS}$ is greater than $C_{LSS}$ at operation 540. If $D_{LSS}$ is greater than $C_{LSS}$, the BM-SC sets $D_{LSS}$=0 and TS=TS+$L_{SS}$ at operation 550. If $D_{LSS}$ is not greater than $C_{LSS}$, the BM-SC sets $D_{LSS}$ to $D_{LSS}$+received user packet size, assigns a TS value to the received user packet, and transmits the packet to the MBMS-GW at operation 560. If no user packet is received at operation 510, the BM-SC determines whether t is greater than k*LSS at operation 570. If t is greater than k*LSS at operation 570, the BM-SC sets $D_{LSS}$=0, TS=Ts+$L_{SS}$, and k=k+1 at operation 580 and, otherwise, returns the procedure to operation 510.

Figure 6:
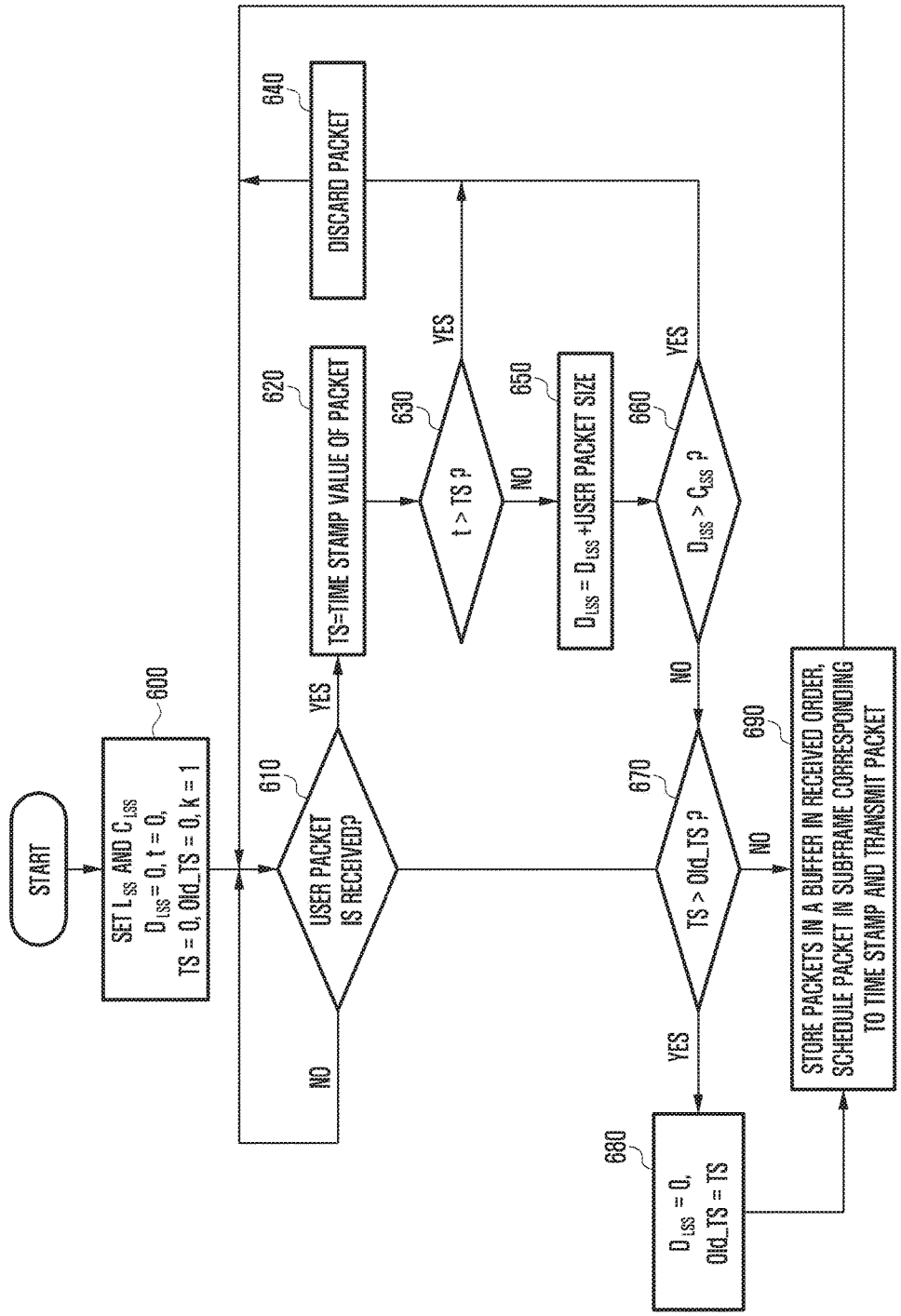
FIG. 6 is a flowchart illustrating a procedure for an eNB to transmit user packets to a user equipment (UE) according to an embodiment of the present disclosure.

FIG. 6 is a flowchart illustrating a procedure for an eNB to transmit user packets to a UE according to an embodiment of the present disclosure.

Referring to FIG. 6, t denotes the current time, TS denotes the time stamp, $L_{SS}$ denotes the synchronization sequence length, $C_{LSS}$ denotes transmittable packet amount (bytes) during $L_{SS}$, and $D_{LSS}$ denotes packet transmission amount during $D_{LSS}$. The TS, $L_{SS}$, $C_{LSS}$, and $D_{LSS}$ are configured per TMGI.

In FIG. 6, the eNB sets $L_{SS}$ and $C_{LSS}$ based on TMGI at operation 600. At this time, the eNB sets $D_{LSS}$=0, t=0, TS=0, Old_TS=0, and k=1 together. Next, the eNB determines whether a user packet is received at operation 610. The eNBs monitors until a user packet is received and, if a user packet is received, updates the TS to the TS value of the received user packet at operation 620. Next, the eNB determines whether t is greater than TS at operation 630 and, is so, discards the packet at operation 640. Otherwise, if t is not greater than TS, the eNB sets $D_{LSS}$ to $D_{LSS}$+ received packet size at operation 650 and determines whether $D_{LSS}$ is greater than $C_{LSS}$ at operation 660. If $D_{LSS}$ is greater than $C_{LSS}$, the eNB discards the packet at operation 640. Otherwise, if $D_{LSS}$ is not greater than $C_{LSS}$, the eNB determines whether the current TS is greater than Old_TS at operation 670 and, if so, sets $D_{LSS}$=0 and Old_TS=TS at operation 680. Otherwise, if TS is not greater than Old_TS, the eNB stores the packets in a buffer in received order and schedules transmission of the packets to the UE in a subframe corresponding to the TS value of the packet at operation 690.

Figure 7:
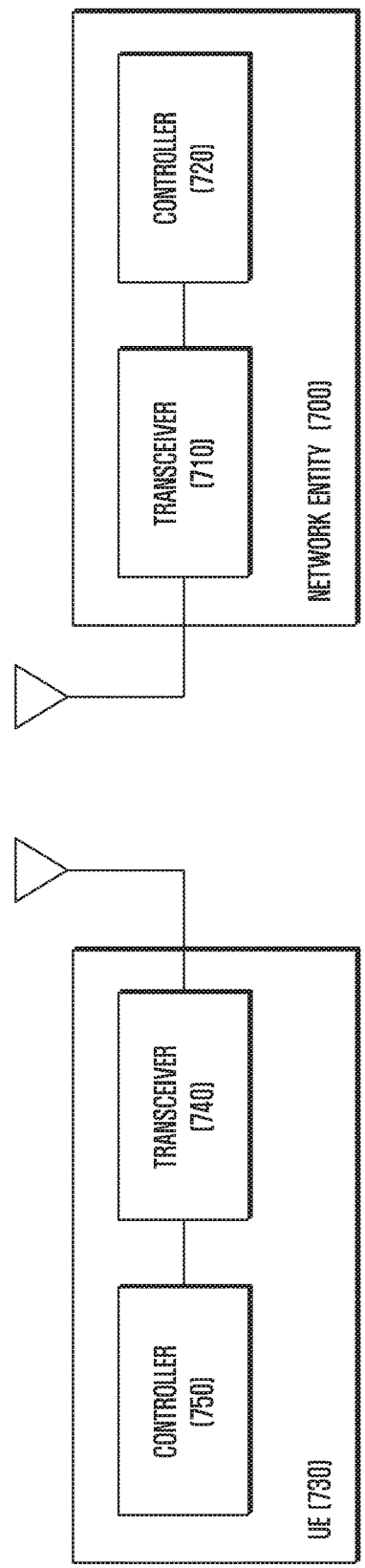
FIG. 7 is a diagram illustrating configurations of a network entity and a UE according to an embodiment of the present disclosure.

FIG. 7 is a diagram illustrating configurations of a network entity and a UE according to an embodiment of the present disclosure. In detail, the network entity may be a BM-SC or an eNB.

Referring to FIG. 7, in the case that the network entity 700 is a BM-SC, the BM-SC 700 may include a transceiver 710 and a controller 720. The transceiver 710 may receive the user packets for an MBMS service, allocates a time stamp to the packet received through a MBMS-GW, and transmits the time stamp-attached packet. At this time, the controller 720 controls the transceiver to perform the above operations and assigns the time stamp. The controller 720 may determine the time stamp value and transmit the time stamp-attached packet as described with reference to FIG. 5.

In the case that the network entity 700 is an eNB, the eNB 700 may include a transceiver 710 and a controller 720. The transceiver 710 may receive the user packets for an MBMS service via a MBMS-GW and transmits the received packet to the UE according to the assigned time stamp. At this time, the controller 720 controls the transceiver 710 to perform the above operations and schedules the packets based on the assigned time stamp, data amount transmittable during the synchronization sequence length, and the user packet size.

The UE 730 may include a transceiver 740 and a controller 750. The transceiver 740 may receive the MBMS service packets transmitted by the eNB through a physical multicast channel (PMCH). At this time, the controller 750 controls the transceiver 740 to perform the above operations.

As described above, the eMBMS-based signal transmission/reception method of the present disclosure is advantageous in terms of reducing packet transmission delay dramatically in the eMBMS-based disaster safety communication service without modification of the eMBMS technology specified in the current standard.

It is to be appreciated that those skilled in the art can change or modify the embodiments without departing from the technical concept of this disclosure. Accordingly, it should be understood that above-described embodiments are essentially for illustrative purpose only but not in any way for restriction thereto. Thus the scope of the disclosure should be determined by the appended claims and their legal equivalents rather than the specification, and various alterations and modifications within the definition and scope of the claims are included in the claims.

In the above described embodiments of the present disclosure, the operations and message transmission may become the targets of being selectively carried out or omitted. In each embodiment of the present disclosure, the operations are not necessary to be performed in the sequential order as depicted but may be performed in a changed order. Each operation and message may be performed independently.

Some or all of the tables exemplified in the above-description are provided to help understand the present disclosure. Accordingly, the detailed description of the table is to express part of the method and apparatus proposed in the present disclosure. That is, it is preferred to approach the content of the table of the specification semantically rather than syntactically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a base station to transmit a user packet in a wireless communication system, the method comprising:
receiving, from a broadcast/multicast service center (BM-SC), a plurality of user packets during a multicast channel scheduling period (MSP), the plurality of user packets respectively including information on a time stamp configured by the BM-SC; and
transmitting the plurality of user packets to a terminal on a physical multicast channel in sequence based on the information on the time stamp using predetermined multicast channel scheduling information (MSI), by initiating a transmission of a first user packet among the plurality of user packets before the MSP elapses,
wherein the information on each time stamp indicates a time to schedule a corresponding user packet among the plurality of user packets for transmitting to the terminal,
wherein the information on each time stamp is based on a synchronization sequence period in which a corresponding user packet among the plurality of user packets is scheduled for transmitting to the terminal,
wherein the synchronization sequence period is shorter than the MSP, and
wherein each time stamp for user packets among the plurality of user packets scheduled for transmitting to the terminal during the synchronization sequence period has a same value.

2. The method of claim 1, further comprising receiving information indicating a user packet transmission scheme from an MBMS coordination entity (MCE).

3. The method of claim 1, wherein a value of each time stamp is determined based on a formula of $([t/x]*x)$, where t denotes a time when the BM-SC transmits a corresponding user packet and x denotes the interval corresponding to a synchronization sequence length.

4. The method of claim 3, wherein, when the plurality of user packets are more than a number of packets transmittable during the synchronization sequence length by the BM-SC, the time stamp of user packets of the plurality of user packets received over the number of packets transmittable during the synchronization sequence length is set to a value calculated by adding the time stamp value to the synchronization sequence length.

5. A method of a terminal to receive a user packet in a wireless communication system, the method comprising:
receiving a plurality of user packets from a base station on a physical multicast channel in sequence based on information on a time stamp, the plurality of user packets being received using predetermined multicast channel scheduling information (MSI), by being initiated a transmission of a first user packet among the plurality of user packets before the MSP elapses,
wherein the information on each time stamp indicates a time to schedule a corresponding user packet among the plurality of user packets for transmitting to the terminal,
wherein the plurality of user packets includes respectively information on a corresponding time stamp configured by a broadcast/multicast service center (BM-SC),
wherein the information on each time stamp is based on a synchronization sequence period in which a corresponding user packet among the plurality of user packets is scheduled for transmitting to the terminal,
wherein the synchronization sequence period is shorter than the MSP, and wherein each time stamp for user packets among the plurality of user packets scheduled for transmitting to the terminal during the synchronization sequence period has a same value.

6. The method of claim 5, wherein the base station receives information indicating a user packet transmission scheme from an MBMS coordination entity (MCE).

7. The method of claim 5, wherein a value of each time stamp is determined based on a formula of ([t/x]*x), where t denotes a time when the BM-SC transmits a corresponding user packet and x denotes the period corresponding to a synchronization sequence length.

8. The method of claim 7, wherein, when the plurality of user packets are more than a number of packets transmittable during the synchronization sequence length by the BM-SC, the time stamp of user packets of the plurality of user packets received over the number of packets transmittable during the synchronization sequence length is set to a value calculated by adding the time stamp value to the synchronization sequence length.

9. A base station for transmitting user packets in a wireless communication system, the base station comprising:
  a transceiver configured to transmit and receive signals to and from a terminal; and
  at least one processor configured to control the transceiver to:
    receive, from a broadcast/multicast service center (BM-SC), a plurality of user packets during a multicast channel scheduling period (MSP), the plurality of user packets respectively including information on a time stamp configured by the BM-SC, and
    transmit the plurality of user packets to a terminal on a physical multicast channel in sequence based on the information on the time stamp using predetermined multicast channel scheduling information (MSI), by initiating a transmission of a first user packet among the plurality of user packets before the MSP elapses,
  wherein the information on each time stamp indicates time to schedule a corresponding user packet among the plurality of user packets for transmitting to the terminal,
  wherein the information on each time stamp is based on a synchronization sequence period in which a corresponding user packet among the plurality of user packets is scheduled for transmitting to the terminal,
  wherein the synchronization sequence period is shorter than the MSP, and
  wherein each time stamp for user packets among the plurality of user packets scheduled for transmitting to the terminal during the synchronization sequence period has a same value.

10. The base station of claim 9, wherein the at least one processor is further configured to control receiving information indicating a user packet transmission scheme from an MBMS coordination entity (MCE).

11. The base station of claim 9, wherein a value of each time stamp is determined based on a formula of ([t/x]*x), where t denotes a time when the BM-SC transmits a corresponding user packet and x denotes the period corresponding to a synchronization sequence length.

12. The base station of claim 11, wherein, when the plurality of user packets are more than a number of packets transmittable during the synchronization sequence length by the BM-SC, the time stamp of user packets of the plurality of user packets received over the number of packets transmittable during the synchronization sequence length is set to a value calculated by adding the time stamp to the synchronization sequence length.

* * * * *